UNITED STATES PATENT OFFICE.

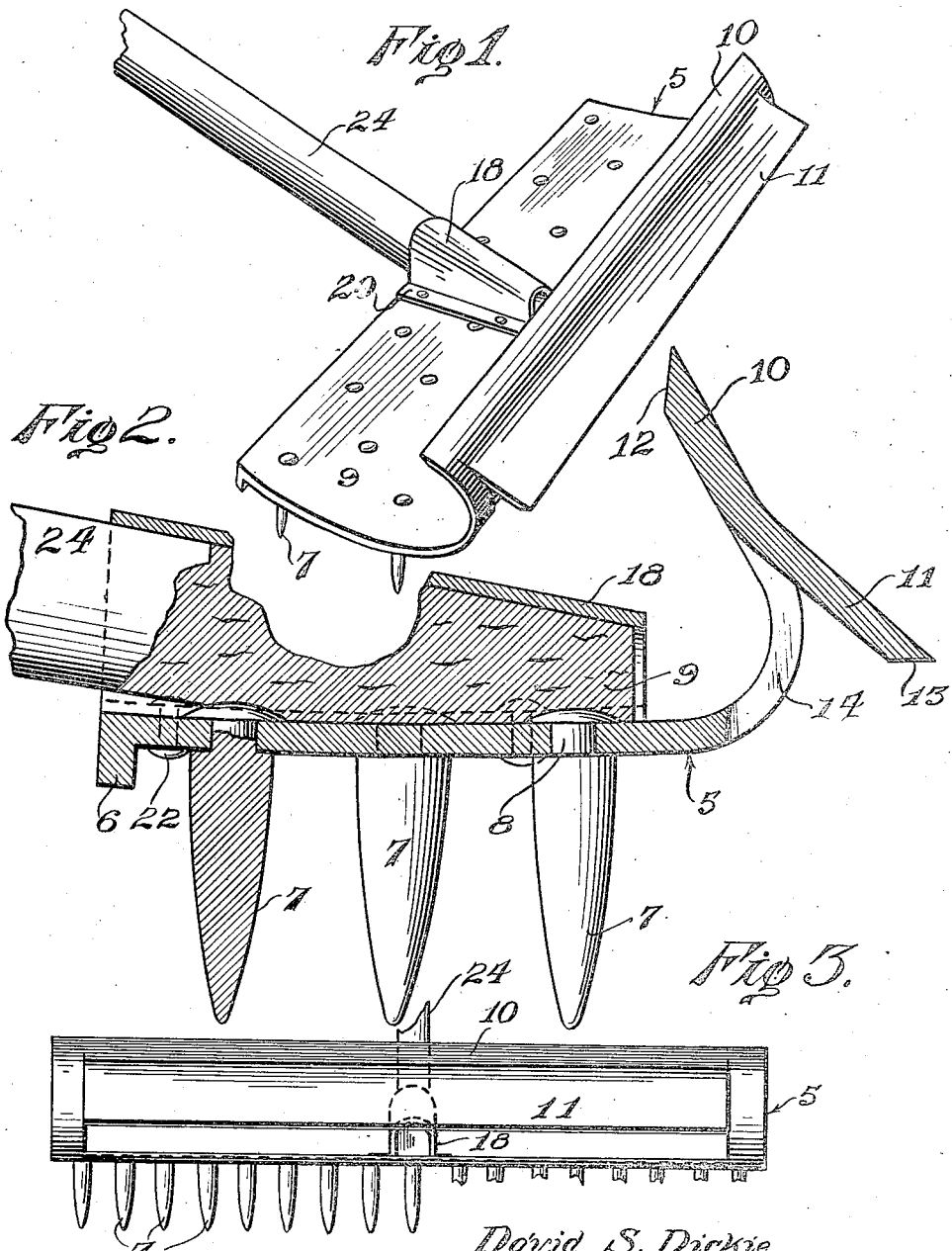

DAVID S. DICKIE, OF WINIFRED, MONTANA.

GARDEN TOOL.

1,422,090.  Specification of Letters Patent.  Patented July 11, 1922.

Application filed August 19, 1920. Serial No. 404,551.

*To all whom it may concern:*

Be it known that I, DAVID S. DICKIE, a citizen of the United States, residing at Winifred, in the county of Fergus and State of Montana, have invented certain new and useful Improvements in Garden Tools, of which the following is a specification.

This invention relates to improvements in agricultural implements and more particularly to a small garden tool capable of a variety of uses.

An important object of this invention is to provide a garden tool having an elongated body provided with a plurality of rows of staggered teeth adapting the device for use as a rake, the rear longitudinal edge portion of the body being provided with a downwardly extending flange which cooperates with the teeth in forming a leveler.

The invention forming the subject matter of this application aims also to provide a garden tool which may be efficiently employed for breaking up clods of dirt and pulverizing the same to any degree of fineness desired.

A further object of the invention is to provide a garden tool which by reason of having an elongated body extending at right angles to the handle may be employed in cultivating the ground between the rows and between the vegetables without changing one's position.

A still further object of the invention is to provide a garden tool which may be efficiently employed for keeping the ground in perfect tilth, both aerating the soil and conserving moisture, thereby rendering its use extremely valuable in sections where the rainfall is scant.

Another object of the invention is to provide a tool of the class described formed with a pair of blades which may be used for weeding and mulching and in a measure as a hoe.

Other objects and advantages of the invention will be apparent during the course of the following description.

In the accompanying drawings forming a part of this application and in which like numerals are employed to designate like parts throughout the same, Figure 1 is a fragmentary perspective of the improved tool, Figure 2 is a central vertical detail transverse section through the same, Figure 3 is a fragmentary front elevation of the tool.

In the drawing, the numeral 5 generally designates the body of the tool which is formed from an elongated blank of metal stamped to provide a downwardly extending flange 6 along one longitudinal edge. The flange 6 extends at right angles to the direction of travel of the body and constitutes a leveler adapted for use when the teeth 7 secured to the body are drawn through the ground or when the device is used as a rake for leveling purposes. The teeth 7 are gradually tapered toward their free ends and have their rear portions formed with reduced shanks 8 which are extended through apertures in the body and are subsequently flattened to form heads 9. As illustrated in Figure 2, the flange 6 terminates above the lower ends of the teeth 7 and engages the surface of the ground so as to effectively level the same. The elongated body 5 is curved transversely or is slightly concaved so as to reduce the friction between the body and the ground as the body is drawn along the ground.

When it is desired to brake up clods of dirt and pulverize the same to any degree of fineness, it is merely necessary to strike the clods of dirt a downward blow with the under side of the body and thereby engage the teeth with the clods of dirt. This operation may be repeated until the clods have been completely broken up and if desired the device may then be used as a mulcher for further pulverizing the dirt.

As illustrated in Figure 2, the body 5 is bent upon itself at a point spaced from one longitudinal edge so as to extend the adjacent longitudinal edge portion upwardly and rearwardly thereby forming an overhanging blade 10. The rolled or transversely curved portion of the body is formed with a U-shaped incision which provides a second blade 11 merging into the blade 10. The edge portions of the blades 10 and 11 are beveled inwardly to form cutting edges 12 and 13 respectively which are adapted for use in weeding and in fact for a variety of other uses.

The partly severed portion which forms the blade 11 provides an elongated longitudinally extending opening 14 in the rolled portion of the body so as to permit the material upon being engaged by the cutting edges 12 to pass through the body. In other words, the opening 14 prevents an accumulation of material in the rolled portion of the body. Likewise the material upon being engaged or worked by the blade 11 may pass through the opening 14. When the blades 10 and 11 are employed, the body of course is reversed so that the blades will be engaged with the ground. With particular reference to Figure 2 it will be observed that the blades are slightly concaved so that they will be possessed of the desired "set." In giving the blade this natural "set," the cutting edges are caused to more readily enter the ground for tilling and aerating the soil and little care is required as to the exact position of the tool when cutting weeds or mulching the ground. A further advantage residing in disposing the blades 10 and 11 angularly with relation to each other is the fact that the cutting edges 12 and 13 are in a measure rendered self-sharpening. The blade 10 permits the device to be used successfully as a hoe especially in the immediate vicinity of small plants and where deeper cultivation is essential.

The body is provided intermediate its ends with a tapered socket 18 having its longitudinal edge portions formed with attaching flanges 20 which may be secured to the body by means of rivets 22 or the like. The socket 18 receives the tapered forward end portion of a handle 24 which, as illustrated in Figure 1, extends at right angles to the length of the body.

In carrying out the invention the body of the tool may be made in a variety of sizes. However, the body should be of elongated formation and extend at right angles to the longitudinal axis of the handle so that it may be employed for working between the individual plants and for working between the rows of plants for either mulching the ground or for cutting weeds.

In the use of the device as a rake, the same is extremely efficient by reason of the fact that it is provided with a plurality of rows of teeth which are arranged in staggered relation so that the ground will be thoroughly worked.

Summarized, it may be said that a garden tool constructed in accordance with this invention is extremely economical by reason of the fact that the same is capable of a variety of uses. Further the user is enabled to save much time since he may employ the tool for a variety of purposes.

Also, the tool features both the blade and scratch weeder tools now in vogue. The teeth of the tool may be effectively employed for destroying weeds, especially if the weeds are small. If the weeds are large, the blades 10 and 11 may be advantageously brought into use.

Since the blades 10 and 11 are oppositely disposed, the same may be employed for cutting on both the forward and rearward movement of the tool. Further, the blades are concaved or dished so as to give the tool a natural "set" and so as to make the blades self-sharpening. Also, less care is required as to the exact position of the tool when cutting weeds or mulching the ground.

It is to be understood that the form of the invention herewith shown and described is to be taken as a preferred embodiment of the same but that such minor changes in construction and arrangement of parts may be made as will remain within the spirit of the invention and the scope of what is claimed.

Having thus described the invention, what is claimed as new is:

1. A garden tool comprising a transversely curved elongated plate having one longitudinal edge portion extended rearwardly in the direction of the major portion of the plate thereby forming an overhanging blade, a second blade projecting forwardly from the overhanging blade, and a handle connected to said plate at the other longitudinal edge of the same.

2. A garden tool comprising an elongated plate of metal having one longitudinal edge portion curved upon itself thereby forming an overhanging blade, a second blade projecting forwardly from the overhanging blade, the curved portion of the plate being provided with a longitudinally extending opening forming a passage for the material worked by said blades, and a handle connected to said plate at the opposite longitudinal edge thereof.

3. A garden tool comprising a body of elongated formation having one longitudinal edge portion curved upon itself thereby forming a blade, the curved longitudinal edge portion of said body being provided with an incision defining a second blade, said first and second named blades being extended angularly with relation to each other whereby the blades will be presented to the ground angularly on the forward and rearward movement of the body, and a handle connected to the body.

4. A garden tool comprising a plate having one longitudinal edge portion doubled upon itself to form an overhanging rearwardly projecting blade, a second blade struck from the doubled portion of the plate to project forwardly therefrom, and a handle secured to the plate at the edge remote from the blades.

In testimony whereof, I affix my signature in the presence of two witnesses.

DAVID S. DICKIE.

Witnesses:
STEPHEN E. SANDE,
GRACE H. REYLECT.